United States Patent [19]

Chapman

[11] Patent Number: 5,167,196
[45] Date of Patent: Dec. 1, 1992

[54] ADJUSTMENT MECHANISM FOR SEWING MACHINE

[75] Inventor: Walter F. Chapman, Chesterfield, Va.

[73] Assignee: AMF-Reece, Inc., Richmond, Va.

[21] Appl. No.: 709,305

[22] Filed: Jun. 3, 1991

[51] Int. Cl.⁵ .................... D05B 75/00; B23Q 16/00
[52] U.S. Cl. .................................... 112/260; 33/568; 403/4; 403/388; 403/408.1
[58] Field of Search .............. 112/110, 111, 112, 260; 403/4, 388, 393, 408.1; 33/813, 568, 838, 1 M; 83/522.18, 640, 700

[56] References Cited

U.S. PATENT DOCUMENTS

| | | | |
|---|---|---|---|
| 2,555,243 | 5/1951 | Parker | 33/813 |
| 3,125,046 | 3/1964 | Pedersen | 112/110 |
| 3,229,373 | 1/1966 | Benton et al. | 33/568 X |
| 3,991,478 | 11/1976 | Stone | 33/568 |
| 4,303,362 | 12/1981 | Lockhart | 403/408.1 X |
| 4,532,711 | 8/1985 | Shirai | 33/813 X |
| 4,565,094 | 1/1986 | Sedgewick | 33/568 X |
| 5,058,515 | 10/1991 | Chapman et al. | 112/112 |

FOREIGN PATENT DOCUMENTS 258072 9/1912 Fed. Rep. of Germany .

Primary Examiner—Werner H. Schroeder
Assistant Examiner—Paul C. Lewis
Attorney, Agent, or Firm—Staas & Halsey

[57] ABSTRACT

An adjustment mechanism for a button stitching machine includes a shaft rotatably mounted in a support block and having a threaded, forwardly extending portion and a rearwardly extending portion. The threaded forwardly extending portion threadedly engages a bore provided in a rear end of a rear tongue of the button stitching machine. Rotation of the shaft causes the rear tongue to advance and retreat accordingly. A potentiometer-type dial provides an inner scale graduated for indicating fractions of a turn and an outer scale which counts the number of turns.

15 Claims, 4 Drawing Sheets

ADJUSTMENT MECHANISM FOR SEWING MACHINE

BACKGROUND OF THE INVENTION

1. Field of the Invention

The present invention relates generally to sewing machinery and, more specifically, to an adjustment mechanism for a tongue of a button stitching machine.

2. Description of the Related Art

A button stitching machine is described in co-pending application, U.S. Ser. No. 07/362,244, filed June 6, 1989, now U.S. Pat. No. 5,058,515. One aspect of this machine is illustrated in FIG. 1 herein, whereby a tongue assembly 10 includes a rear tongue 12 and a lift-up tongue 14 which is pivotally mounted to the forward end of the rear tongue 12 so as to pivot upwardly about a horizontal pivot axis in the direction "B". The rear tongue 12 is mounted on a carriage 16 which is movably mounted on a support 18 so that the tongue assembly 10 can be moved between a rearward, inoperative position and a forward operative position. FIG. 1 illustrates the carriage and tongue assembly 10 in the forward operative position. In this position, a button 20 is stitched to a piece of fabric (not shown) which is folded around the end of the lift-up tongue 14. When the carriage and tongue assembly are in the operative position, the end of the lift-up tongue 14 is positioned such that a needle 22 enters or passes very closely to one of the slots 24 provided in the end of the lift-up tongue 14. Means for controlling and driving the needle 22 are schematically shown as control means 26. The control means 26 drives and controls vertical reciprocating movement of the needle 22 as it is passed from an upper needle bar 28 to a lower needle position (not shown), thereby reciprocating in the direction "C".

An additional drive and control means is schematically illustrated as control means 30 for moving the button 20 relative to a pressing member 32 during the stitching operation so that the needle thread 34 passes through the holes of the button 20. A foot 36 is either manually controlled or controlled by a control means 26 to press downwardly during the stitching operation thereby clamping the material being stitched against the top surface of the lift-up tongue 14. The foot is moved in the direction "F" in a conventional manner.

The rear tongue 12 is slidably connected to the carriage 16 by adjustment screws 38 which pass through slots 40 and are received in threaded bores (not shown) formed in the upper surface of the carriage 16. The slots 40 are elongated in the direction of sliding for the purpose of initial calibration of a position of the leading edge of the lift-up tongue in its operative position. Once the position of the leading edge of the tongue is initially calibrated, the screws 38 are tightened to lock the position of the leading edge of the lift-up tongue 14.

To facilitate the initial adjustment, an abutment screw 42 is provided in a mounting plate 44 which is mounted on the rear end 16a of the carriage 16. The abutment screw 42 has a threaded shaft portion 42a, a hex nut portion 42b, and a head portion 42c, all three portions being integrally formed. The end of the threaded shaft portion 42a abuts the end face 12a of the rear tongue 12. As shown in FIG. 1(a), if it becomes necessary to adjust the position of the rear tongue 12 forwardly, the two screws 38 are at first loosened by the operator with an appropriate tool. Then, the screw 42 is turned clockwise with either a screwdriver or by hand, if possible, so that the threaded portion 42a extending beyond the inner surface of the support plate 44 becomes longer by axially advancing the screw 42 as the screw rotates, thus pushing the rear tongue 12 forwardly.

The flat surfaces of the hex nut portion 42b are provided with numbers to indicate an adjusted position. The operator can then be told at what position the screw 42 should be turned to by indicating the number or other indicia which should appear on the uppermost flat surface of the hex nut portion 42b. The selected position is maintained by a leaf spring 46 mounted on a pintle 48 by means of a screw 50 so that as the screw 42 is turned, the leaf spring deflects downwardly until a surface of the hex nut portion is parallel to a normal position of the leaf spring 46. Once the operator sees that the adjustment number or other indicia is facing upwardly on the hex nut portion 42b, the screws 38 are then tightened to lock the position of the rearward tongue 12.

FIG. 1a shows the full-forward adjusted position of the rear tongue 12. The full-forward position is reached when the hex nut portion 42b abuts the outer surface of the support plate 44. To move the rear tongue 12 rearwardly, the screws 38 must be loosened again, and then the screw 42 is rotated counter clockwise (assuming a normal thread) to the desired adjusted position. However, when a rearward adjustment is made, since the end of the threaded portion 42a is not connected to the end face 12a of the rear tongue 12, the rear tongue 12 does not move rearwardly except until the operator pushes it rearwardly, usually after the screw 42 has been rotated to the desired adjusted position.

Thus, although the adjustment mechanism illustrated in FIGS. 1 and 1a provides an adequate means for making a fine adjustment of the position of the lift-up tongue 14, the adjustment mechanism requires at least one tool, i.e., a screwdriver for the adjustment screw 42 and screws 38. Moreover, two tools would be required if the screw 42 has a normal screw head but the screws 38 have a different head, such as a hex-socket. Moreover, since it is necessary for the operator to ensure that the screw 42 is always abutting the end face 12a at the rear tongue 12, there is always a possibility of operator error in tightening the screws 38 without such proper abutment as would be required.

In addition, because the hex nut portion 42b has six sides, there are only six discrete positions of adjustment for the screw, corresponding to only one complete rotation of the screw 42. Thus, the range of fine adjustment, and the positions in that range are somewhat limited.

SUMMARY OF THE INVENTION

An object of the present invention is therefore to provide an adjustment mechanism capable of providing a wider range of movement, with a greater number of adjustment positions within that range, for more precision adjustment of a fabric support member.

Another object of the present invention is to provide an adjustment mechanism which requires no tools and fewer operator manipulations, thereby reducing the chances for operator error.

These and other objects of the invention are met by providing an adjustment mechanism for adjusting a position of a fabric support member relative to a sewing needle, said fabric support member being slidably mounted on a carriage, said carriage having a rearward end and said fabric support member having a rearward end, the adjustment mechanism having a support block mounted on the rearward end of the carriage, a shaft rotatably mounted in the support block and having a threaded, forwardly extending portion and a rearwardly extending portion, said shaft being constrained from moving axially, a threaded bore formed in the rearward end of the fabric support member and threadedly engaging the forward extending portion of the shaft, whereby rotation of the shaft in clockwise and counter-clockwise directions imparts forward and rearward translatory movement of the fabric support member.

Preferably, the rearwardly extending portion of the shaft is provided with a knob having position indicators associated therewith.

These and other features and advantages of the adjustment mechanism will become more apparent with reference to the following detailed description and drawings.

DETAILED DESCRIPTION OF THE PREFERRED EMBODIMENTS

Figure 2:
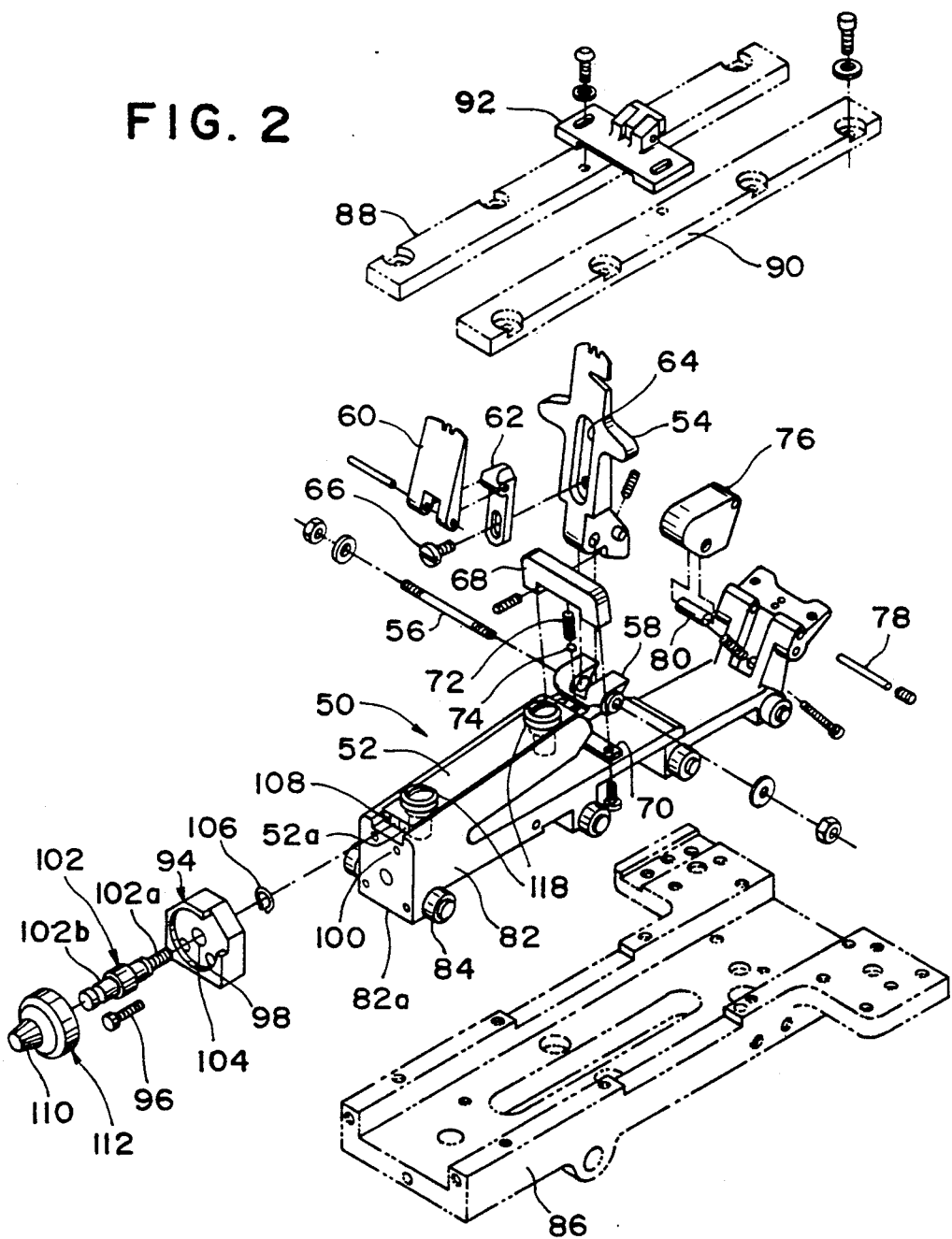
FIG. 2 is an exploded view showing an adjustment mechanism according to the present invention.

Referring now to FIG. 2, an adjustment mechanism according to the present invention is illustrated in an exploded view. The mechanism adjusts a position of a fabric support member, such as a tongue assembly 50 which includes a rear tongue 52 and a lift-up tongue 54. The lift-up tongue 54 is pivotally connected to the rear tongue 52 by means of a pivot pin 56 which passes through a trunion 58 of the rear tongue 52. The lift-up tongue 54 includes an adjustable tongue portion 60 pivotally connected to a block 62 received in a groove 64 of the lift-up tongue 54. The block is positionally adjusted by a screw 66.

A slide 68 and corresponding step 70 are provided with a spring 72 and ball 74 to provide an adjustment described in the aforementioned U.S. Patent Application No. 07/362,244, now U.S. Pat. No. 5,058,515 which is incorporated herein by reference. Also, a material grip member 76 of FIG. 2 corresponds to element 32 of FIG. 1 and is provided with a mounting pin 78 and a spring pivot 80.

Figure 1:
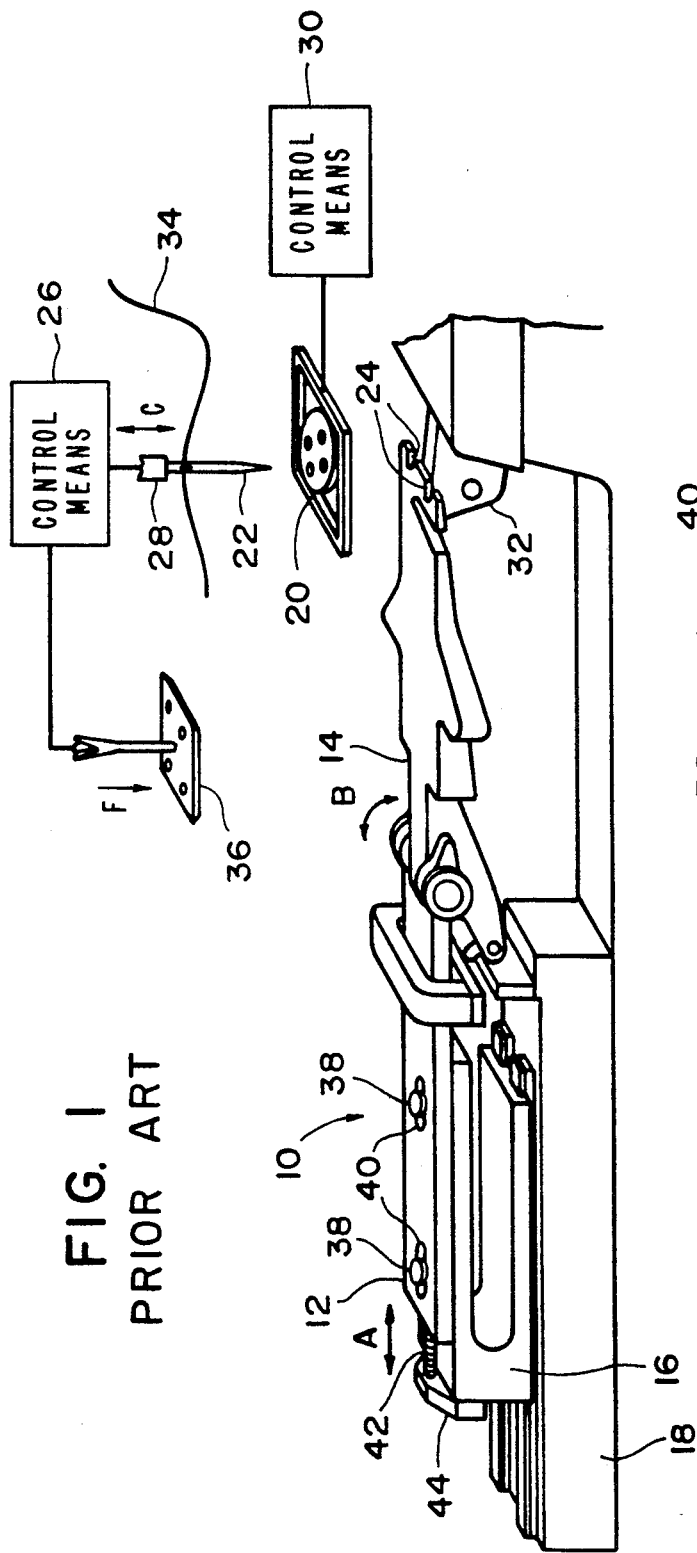
FIG. 1 is a perspective view, partly schematic, showing a portion of a button stitching machine employing a non-adjustment mechanism.
Figure 1A:
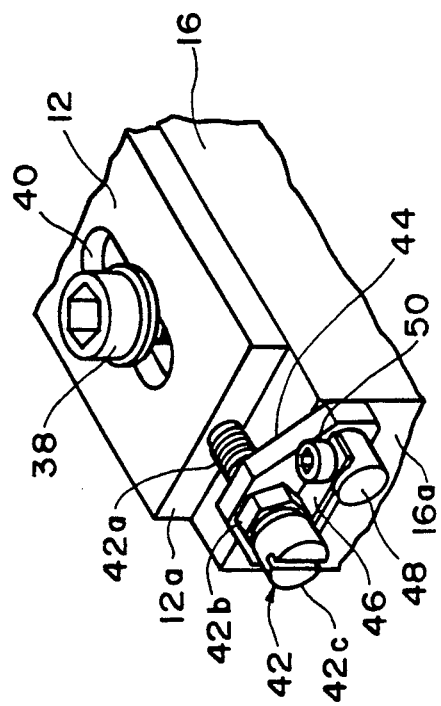
FIG. 1a is an enlarged, reverse perspective view showing details of an adjustment screw of the adjustment mechanism of FIG. 1.

The carriage 82 is slightly different from the carriage of FIG. 1, in that four rollers 84 are provided on the bottom of the carriage so that the carriage can slide on the rollers between a lower plate 86 and upper plates 88 and 90 mounted on opposite sides of the lower plate 86. The rollers 84 allow the carriage 82 to move from the inoperative position to the operative position in a similar manner to that which is described in the aforementioned patent application. A stop plate 92 provides a limit to the forward movement of the carriage for its movement between operative and inoperative positions.

The rear tongue 52 is mounted in a U-shaped groove provided longitudinally in the upper surface of the carriage 82 so as to prevent lateral movement of the rear tongue 52 while permitting longitudinally sliding movement of the rear tongue 52 along the carriage 82. The carriage 82 has a rearward end 82a and the rear tongue 52 has a rearward end 52a.

A support block 94 is mounted on the rearward end 82a of the carriage 82 by conventional means, such as threaded fasteners 96 which pass through holes 98 in the support block and threadedly engage threaded bores 100 provided in the rearward end 82a of the carriage 82.

A shaft 102 is rotatably mounted in the support block 94 and has a threaded, forwardly extending portion 102a and a rearwardly extending portion 102b. The shaft 102 is free to rotate in a smooth bore 104 formed centrally in the support block 94 while being constrained from moving axially by a retaining ring 106.

A threaded bore 108 is formed in the rearward end 52a of the rear tongue 52 and threadedly engages the forwardly extending portion 102a of the shaft 102. Since the rear tongue 52 cannot rotate, and since the shaft 102 cannot translate, rotation of the shaft 102 will cause axial translation of the rear tongue 52 either forwardly or rearwardly, depending on the direction of rotation of the shaft 102. With a normal thread, clockwise rotation of the shaft 102 will impart forward translatory movement of the rear tongue 52 and thus the forward end of the lift-up tongue 54.

The rearwardly extending portion 102b of the shaft 102 carries a knob 110 which is part of a drive assembly 112. Basically, the knob 110 is mounted on the rearwardly extending portion of the shaft 102 so that rotation of the knob causes rotation of the shaft.

The drive assembly 112 is a commercially available product which is ordinarily used with potentiometers. The assembly is manufactured by Clarostat Manufacturing Co., Inc., of Dover, New Hampshire. Various models under the trademark CLARODIAL can be used, including model nos. 316-12, 316-11, and 411. Ordinarily, the CLARODIAL products are used with a potentiometer shaft which extends into the assembly and is locked thereon by a set screw. Thus, the ordinary use of the CLARODIAL assembly is in conjunction with a multi-turn potentiometer.

Figure 3:
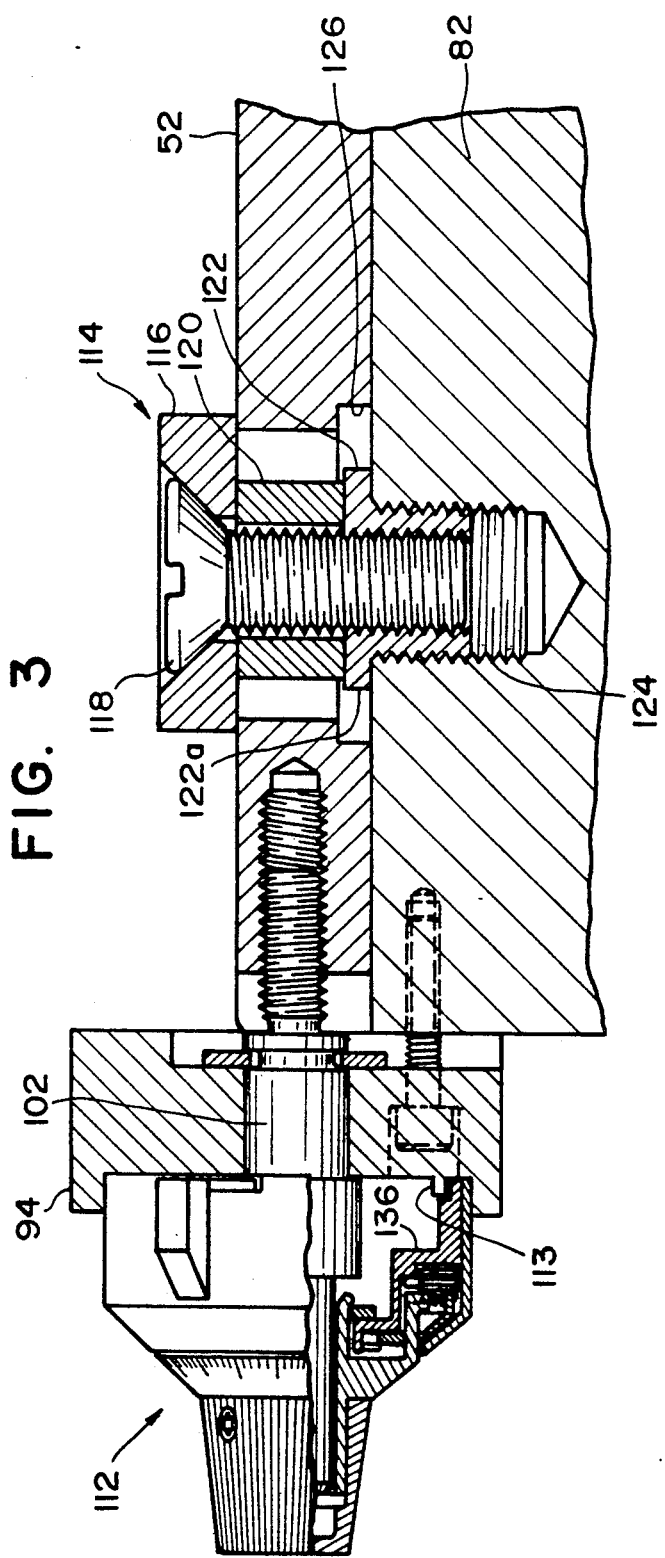
FIG. 3 is an enlarged longitudinal cross-sectional view of the portion of the assembled adjustment mechanism according to FIG. 2.
Figure 3A:
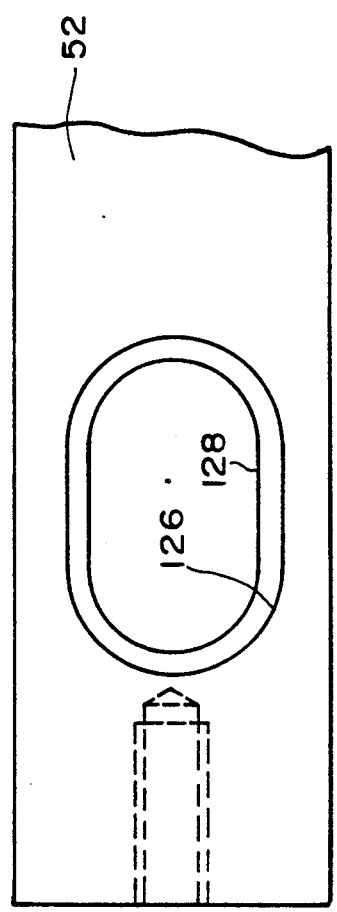
FIG. 3(a) is an enlarged bottom view of the rear tongue according to the present invention illustrating the two slots formed therein.
Figure 3B:
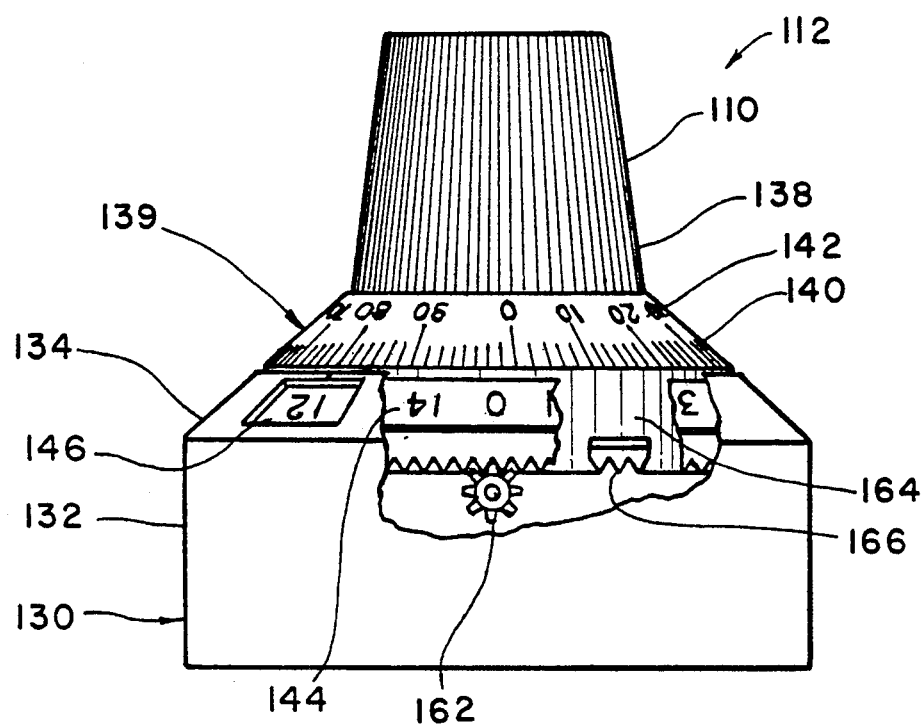
FIG. 3(b) is a detailed view showing the gear used to rotate the incrementally driven dial of the drive assembly of the adjustment mechanism of the present invention.

The drive assembly 112 causes the rear tongue 52 to slide. Sliding motion is facilitated by a pair of slide assemblies. Referring to FIGS. 3 and 3(a), each slide assembly 114 includes an upper washer 116, a mounting screw 118 counter sunk into the washer 116, a spacer 120 and a threaded insert 122. The threaded insert 122 has a threaded outer diameter which threadedly engages a threaded bore 124 formed in the carriage 82. The threaded insert 122 also has a threaded inner diameter for threadedly engaging the screw 118. The spacer 120 is sandwiched between an upper disc portion 122a of the threaded insert 122 and the upper washer 116. Thus, when the screw 118 is tightened, the lower surface of the washer 116 bears on the upper surface of the spacer 120 and not the upper surface of the rear tongue 52, so that the rear tongue 52 is free to slide fore and aft without loosening the screws 118.

The rear tongue 52 is provided with a pair of elongated openings, each including a first slot 126 and a second slot 128. The two slots 126 and 128 are co-extensive and provide a two-step opening through the rear tongue 52. The width of the first slot 126 corresponds substantially to the diameter of the disc portion 122a of the threaded insert 122, while the second slot 128 has a width substantially corresponding to that of the spacer 120. As the shaft 102 is caused to rotate, the rear tongue 52 translates accordingly, with a range of movement substantially being determined by the length of the slots 126 and 128. As a practical matter, the range of necessary adjustment is very slight, on the order of ⅛ to ¼ of an inch. Adjustments are usually made when switching from one type of fabric to another, based on the differences in thickness of the fabrics to which the buttons are being stitched. These adjustments can be made according to the present invention on a near micron level due to the fine adjustment feature provided by the drive assembly 112. A very close tolerance or slight contact is provided between the lower surface of the washer 116 and the upper surface of the rear tongue 52 to prevent vertical movement of the rear tongue 52. Any contact between the lower surface of the washer 116 and the upper surface of the tongue 52 should not be sufficient to prevent sliding of the rear tongue 52. Thus, it is intended by the present structure that any adjustments made by using the drive assembly 112 should not necessitate loosening screws 118. In other words, when the screws 118 are tightened, axial translation of the rear tongue 52 is still permitted due to the close tolerance or slight contact between the upper surface of the rear tongue 52 and lower surface of the washer 116. Of course, the illustration in FIG. 3 of the slide assembly 114 is for only one of the screws 118, and the structure provided for the other screw would be the same.

With respect to the close tolerance or slight contact described above, the prevention of vertical movement of the rear tongue 52 can also be assured by maintaining a close tolerance or slight contact between an upper surface of the disc portion 122a of the threaded insert 122 and a bottom surface of the first groove 126.

Figure 4:
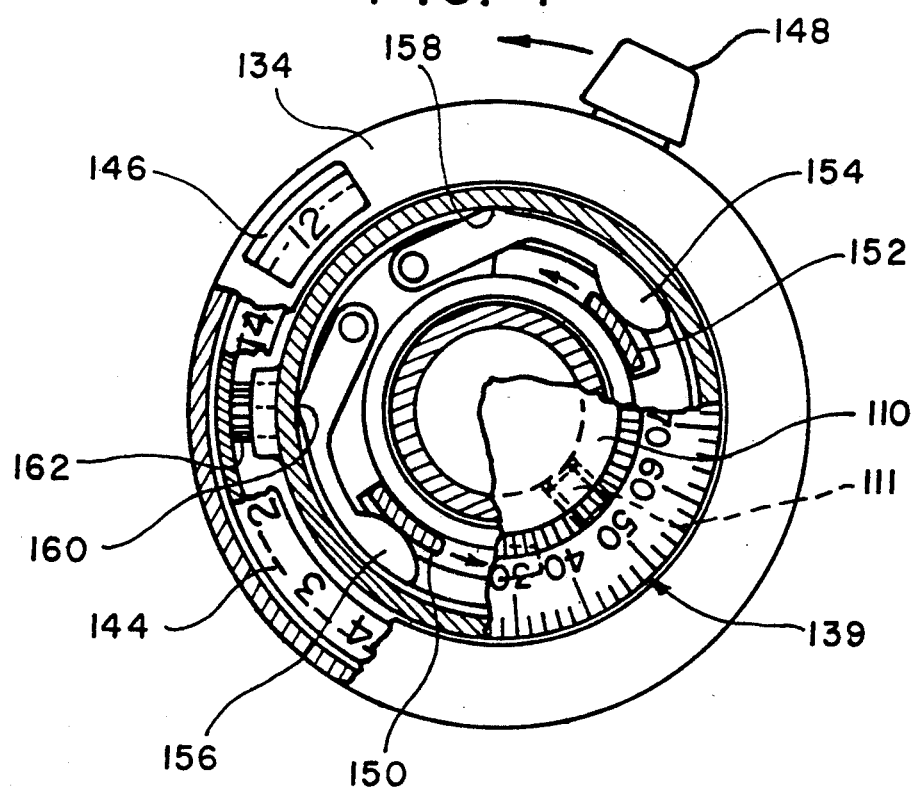
FIG. 4 is a top view, partly in section, showing details of the drive assembly used in the adjustment mechanism according to the present invention.

Details of the drive assembly will now be described with reference to FIGS. 3 and 4. Essentially, the drive assembly 112 includes an outer shell 130 having a cylindrical portion 132 and a conical portion 134. The conical portion 134 defines a circular opening at one end of the shell 130. The assembly 112 nests within a recess of the support block 94 and the shell 130 is prevented from rotating by a pin 113 extending rearwardly from the support block 94 into an opening formed in a support member 136 of the assembly 112. The support member 136 is fitted within the shell 130 and is shaped to accommodate the moving parts to be described below. A knob 138 is fitted onto the end of a rotatable element 139 which is rotatably mounted on the support member 136. The knob 110 is fixed thereto by a set screw 111. A first dial or inner scale 140 is formed on a conical portion of the rotatable element 139. The dial 140 has a profile in line with the conically shaped portion 134 of the shell 130. A plurality of graduated markings 142 are disposed at equally-distantly spaced intervals around the circumference of the dial. The markings may be numbered at measured intervals, such as 10, 20, 30, 40, etc., up to 100, with five individual markings provided between numbered intervals in order to divide the circumference of the dial 140 into fifty subdivisions, thus dividing each 360° turn of the shaft into 7.2° portions (the number fifty is only chosen as an example, and other numbers may be employed).

A second dial or outer dial 144 is provided coaxially with the first dial 140. The second dial 144 can be seen through a window 146 provided in the conical portion 134 of the shell 130. The dial 144 is also marked at equally-distantly spaced intervals with a plurality of sequential numbers starting preferably with zero in order to count the number of revolutions of the shaft 102. Whenever the first dial 140 makes a complete revolution, the second dial 144 is caused to rotate to advance from one number to the next. Depending on how many numbers are provided on the dial 144, the amount of rotation of the dial 144 is selected so that each number is advanced one at a time incrementally. Thus, every time the first dial 140 completes 360° of rotation, the second dial 144 moves to the next sequential number through rotation of a few degrees. For example, if the dial 144 is provided with fifteen numbers around its circumference, each number would be spaced apart at 12° intervals (360/15). Thus, when the first dial 140 completes 360° of rotation, the second dial 144 is rotated 12° to advance the number appearing in the window 146. Of course, if the dial is rotated in the reverse direction, the number appearing on the second dial 144 through the window 146 would decrease.

The required 12° of rotation is delivered by a gear 162 which is journalled in the support member 136. The gear 136 constantly meshes with teeth formed circumferentially in the cylindrical portion of the dial 144. A cylindrical portion 164 of the rotatable element 139 is provided with a limited number of teeth 166 which meshes with the gear 162 only for a limited amount of rotation of the rotatable element 139. The teeth 166 mesh with the gear 162 only when the dial 140 has completed 360° of rotation.

To make a fine adjustment according to the present invention, the operator is given a selection of dial readings that have been predetermined to correspond to different types of fabric or other sewing conditions. For example, if the operator is told to turn to the number "3.12", the knob 110 and thus the dial 140 would be rotated three complete revolutions until the number "3" from the second dial 144 appears in the window 146. Then, the knob 110 would be further turned until the number 12 on the first dial 140 appears under the number "3" displayed in the window 146.

Once the predetermined adjustment position has been reached, the adjusted position can be locked by turning a lever 148. The lever 148 is connected to a pair of cams 150 and 152. The cams cause a pair of brakes 154 and 156 to pivot outwardly so that corresponding projections 158 and 160 impinge upon an inner surface of the cylindrical portion 164 of the rotatable element 139, thereby preventing further rotation of the shaft 102.

From the foregoing, it can be appreciated that the drive assembly 112 also functions as a counter. The drive assembly 112 not only drives the shaft 102 but also provides a driven interconnection between a first dial and a second dial of the counter. In one described embodiment, if the incrementally driven dial 144 is provided with numbers between 0 and 14, then fine adjustments up to 15 complete revolutions of the shaft 102 can be accomplished. Moreover, each revolution of the shaft 102 can be subdivided into, for example, 100 subdivisions so that a 3.6° rotation of the shaft 102 can be quantified.

Other suitable drive assemblies and devices may be employed. For example, instead of the drive assembly 112, the end of the shaft 102 could be provided with a gear or cog which could be driven by a belt or other gear associated with an electric motor. A controller could provide signals to the motor to automatically rotate the shaft 102 by a predetermined amount to achieve a predetermined adjusted position.

The drive assembly 112 could be any appropriate drive mechanism that provides an inner scale (corresponding to the first dial 140) for graduating a single turn of the knob into, for example, 50ths of a turn, with an outer scale counting the number of turns. Each complete revolution of the inner scale transfers the outer scale numeral in the window. Numeral transfer on the outer scale occurs during the last part of rotation which completes a 360° turn of the inner scale. During this transfer, if two numbers appear in the window, the lower numeral is read from the window along with the numbers appearing on the inner scale.

Numerous modifications and adaptations of the present invention will be apparent to those so skilled in the art and thus, it is intended by the following claims to cover all such modifications and adaptations which fall within the true spirit and scope of the invention.

What is claimed:

1. An adjustment mechanism for adjusting a position of a fabric support member relative to a sewing needle, comprising:
   a carriage having a rearward end;
   a fabric support member slidably mounted on said carriage, said fabric support member having a rearward end;
   a support block mounted on said rearward end of said carriage;
   a shaft rotatably mounted in said support block and having a threaded, forwardly extending portion and a rearwardly extending portion, said shaft being constrained from moving axially;
   a threaded bore formed in said rearward end of said fabric support member and threadedly engaging said forwardly extending portion of said shaft, whereby rotation of said shaft in clockwise and counter-clockwise directions imparts forward and rearward translatory movement of said fabric support member;
   a knob mounted on said rearwardly extending portion of said shaft, said shaft being rotatable through rotation of said knob; and
   a preventer for preventing rotation of the shaft once the adjusted position of the fabric support member has been obtained.

2. An adjustment mechanism according to claim 1, wherein said knob includes a first dial rotatable with said knob and a second dial rotatably driven in increments with each revolution of said first dial.

3. An adjustment mechanism according to claim 2, wherein said preventer comprises a brake mechanism actuated by a lever to press against said first dial and thereby prevent rotation of said knob.

4. An adjustment mechanism according to claim 1, further comprising a pair of slide assemblies for slidably mounting said fabric support member on said carriage.

5. An adjustment mechanism according to claim 4, wherein said fabric support member is a tongue assembly of a button stitching machine and includes a rear tongue, and said slide assemblies slidably mount said rear tongue in a U-shaped groove formed in an upper surface of said carriage.

6. An adjustment mechanism according to claim 5, wherein said rear tongue has a pair of elongated openings for receiving respectively said pair of slide assemblies, and each said slide assembly includes a threaded insert threadedly engaging a corresponding threaded bore formed in said carriage;
   a screw threadedly engaging an interior threaded bore of said threaded insert;
   a washer fitted on said screw; and a spacer disposed on said screw between an upper surface of said threaded insert and a lower surface of said washer.

7. An adjustment mechanism for adjusting a position of a fabric support member relative to a sewing needle comprising:
   a fabric support member slidably mounted on said carriage, said fabric support member having a rearward end;
   a support block mounted on the rearward end of said carriage;
   a shaft rotatably mounted in said support block and having a threaded, forwardly extending portion and a rearwardly extending portion, said shaft being constrained from moving axially;
   a threaded bore formed in said rearward end of said fabric support member and threadedly engaging said forwardly extending portion of said shaft, whereby rotation of said shaft in clockwise and counter-clockwise directions imparts forward and rearward translatory movement of said fabric support member;
   a rotator for rotating said shaft; and
   a correlator for correlating an amount of shaft rotation to an adjustment position of said fabric support member.

8. An adjustment mechanism according to claim 7, wherein said correlator comprises a counter coupled to said rotator for counting an amount of rotation of said shaft imparted by said rotator.

9. An adjustment mechanism according to claim 8, wherein said counter and rotator comprise a drive assembly which includes a knob, a first dial connected to said knob, and being rotatable with said knob, said knob and said first dial being coupled to said rearwardly extending portion of said shaft, and a second dial coaxially disposed around said first dial and being rotatable in angular increments by said first dial when said first dial completes 360° of rotation.

10. An adjustment mechanism according to claim 9, wherein said drive assembly further includes a brake actuated by a lever to selectively prevent rotation of said first dial when a predetermined adjustment position of said fabric support member has been obtained.

11. An adjustment mechanism according to claim 10, wherein said drive assembly includes an outer shell having a window through which said second dial is visible.

12. An adjustment mechanism according to claim 11, wherein said drive assembly further includes a gear constantly meshing with teeth formed circumferentially on the second dial, and said first dial has teeth formed on a portion of a circumference thereof, said teeth of said first dial meshing with said gear only when said first dial has completed 360° of rotation, whereby the teeth of said first dial drive said gear which then drives said second dial by an amount sufficient to advance a reading on said second dial incrementally.

13. An adjustment mechanism for adjusting a position of a fabric support member relative to a sewing needle comprising:

a carriage having a rearward end;

a fabric support member being slidably mounted on said carriage and said fabric support member having a rearward end;

a support block mounted on said rearward end of said carriage;

a shaft rotatably mounted in said support block and having a threaded, forwardly extending portion and a rearwardly extending portion, said shaft being constrained from moving axially;

a threaded bore formed in said rearward end of said fabric support member and threadedly engaging said forwardly extending portion of said shaft, whereby rotation of said shaft in clockwise and counter-clockwise directions imparts forward and rearward translatory movement of said fabric support member;

a knob mounted on said rearwardly extending portion of the shaft, said shaft being rotatable through rotation of said knob;

an inner scale rotatable with said knob and being graduated to indicate fractions of a turn of said shaft; and an outer scale, rotatable in increments by said inner scale when said inner scale has completed a 360° turn, and being numbered to count a number of turns of said shaft.

14. An adjustment mechanism according to claim 13, wherein said inner scale and said outer scale are rotatably mounted in a housing which includes a brake for preventing rotation of said shaft once the adjusted position of said fabric support member has been obtained.

15. An adjustment mechanism according to claim 14, wherein said housing has a window through which the outer scale numbers can be seen.

* * * * *